(12) United States Patent
Sharma et al.

(10) Patent No.: US 7,633,877 B2
(45) Date of Patent: Dec. 15, 2009

(54) METHOD AND APPARATUS FOR MEETING COMPLIANCE FOR DEBUGGING AND TESTING A MULTI-SPEED, POINT-TO-POINT LINK

(75) Inventors: Debendra Das Sharma, Santa Clara, CA (US); Ajay V. Bhatt, Portland, OR (US); David S. Dunning, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 770 days.

(21) Appl. No.: 11/283,303

(22) Filed: Nov. 18, 2005

(65) Prior Publication Data

US 2007/0115831 A1    May 24, 2007

(51) Int. Cl.
*H04L 12/26* (2006.01)
(52) U.S. Cl. ..................................... 370/241
(58) Field of Classification Search ........................ None
See application file for complete search history.

(56) References Cited

U.S. PATENT DOCUMENTS

| | | | |
|---|---|---|---|
| 6,009,488 A | | 12/1999 | Kavipurapu |
| 7,132,823 B2* | | 11/2006 | Ng et al. .................. 324/158.1 |
| 7,437,643 B2* | | 10/2008 | Khanna et al. .............. 714/733 |
| 7,444,558 B2* | | 10/2008 | Mitbander et al. .......... 714/716 |
| 2004/0204912 A1* | | 10/2004 | Nejedlo et al. .............. 702/188 |

OTHER PUBLICATIONS

PCI-SIG, PCI Express™ Base Specification Revision 1.0a, 426 pages, Apr. 2003.*
Nejedlo, IBIST (Interconnected Built-in-Self-Test) Architecture and Methodology for PCI Express, IEEE, 9 pages, 2003.*

* cited by examiner

*Primary Examiner*—Frank Duong
(74) *Attorney, Agent, or Firm*—Blakely, Sokoloff, Taylor & Zafman LLP

(57) ABSTRACT

A method and apparatus for meeting compliance for debugging and testing a multi-speed, point-to-point link. In one embodiment, the method includes the selection of a compliance speed for a point-to-point link from at least two link frequencies supported by the point-to-point link. Once the compliance speed is selected for the point-to-point link, the point-to-point link is caused to enter a compliance testing mode. During compliance testing mode, a controller of the point-to-point link sets a compliance speed of the point-to-point link to the selected compliance speed. Once a compliance speed is set, a transmitter of the point-to-point link transmits a compliance pattern at the selected compliance speed. In one embodiment, the transmission of the compliance pattern at the selected compliance speed is used to generate a worst case eye diagram to determine compliance of the point-to-point link to a link specification. Other embodiments are described and claimed.

25 Claims, 11 Drawing Sheets

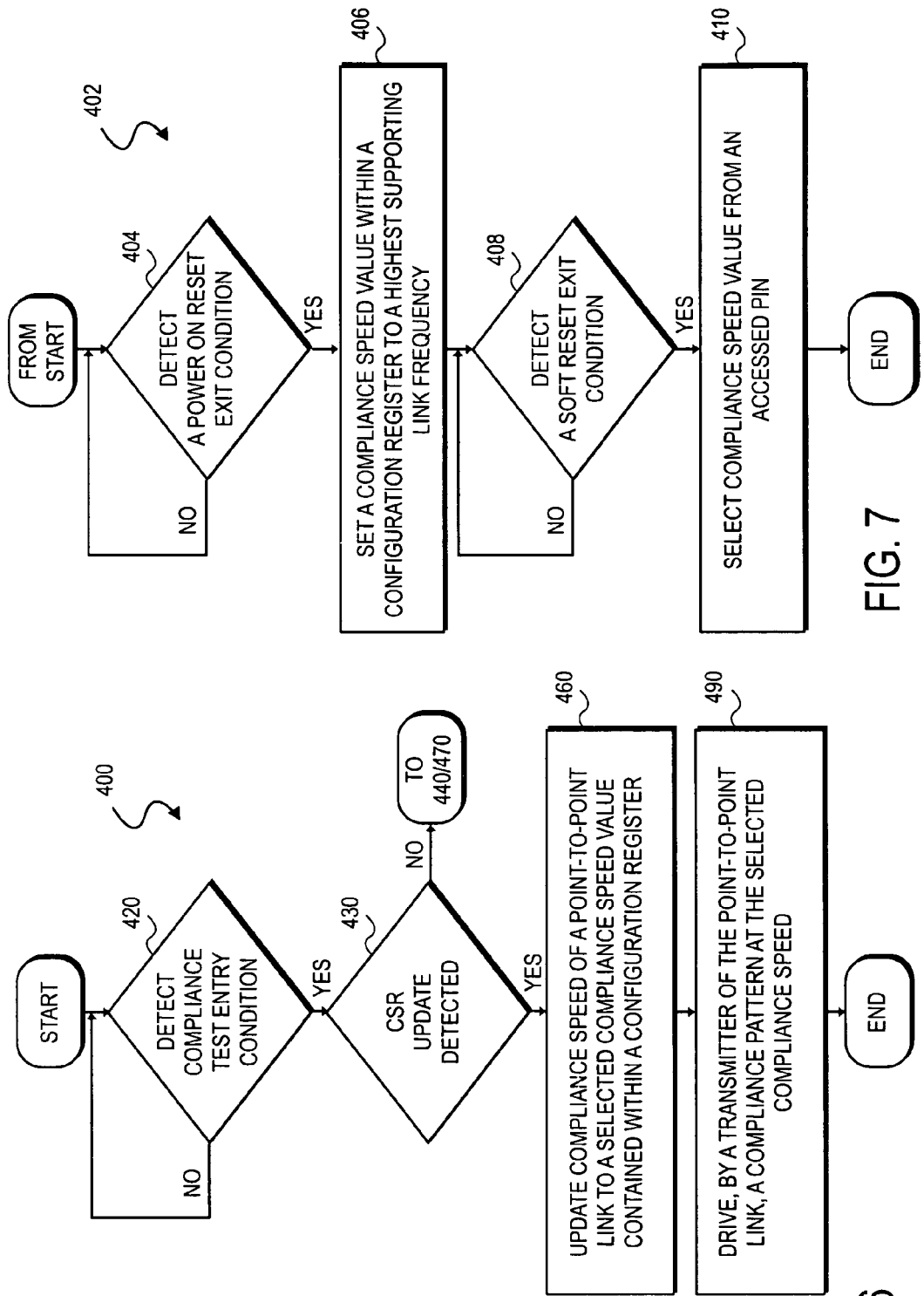

METHOD AND APPARATUS FOR MEETING COMPLIANCE FOR DEBUGGING AND TESTING A MULTI-SPEED, POINT-TO-POINT LINK

FIELD

One or more embodiments relate generally to the field of integrated circuit and computer system design. More particularly, one or more of the embodiments relate to a method and apparatus for meeting compliance for debugging and testing a multi-speed, point-to-point link.

BACKGROUND

During the past decade, peripheral component interconnect (PCI) has provided a very successful general purpose input/output (I/O) interconnect standard. PCI is a general purpose I/O interconnect standard that utilizes PCI signaling technology, including a multi-drop, parallel bus implementation. Unfortunately, traditional multi-drop parallel bus technology is approaching its practical performance limits. In fact, the demands of emerging and future computing models will exceed the bandwidth and scalability limits that are inherent in multiple drop, parallel bus implementations.

Accordingly, it is clear that meeting future system performance needs requires I/O bandwidth that can scale with processing and application demands. Alongside these increasing performance demands, the enterprise server and communication markets require improved reliability, security and quality of service guarantees. Fortunately, technology advances and high speed point-to-point interconnects are enabling system designers to break away from the bandwidth limitations of multiple drop, parallel buses. To this end, system designers have discovered a high-performance, third generation I/O (3GIO) interconnect that will serve as a general purpose I/O interconnect for a wide variety of future computing and communications platforms.

3GIO comprehends the many I/O requirements presented across the spectrum of computing and communications platforms and rolls them into a common scalable and extensible I/O industry specification. One implementation of 3GIO is the PCI Express specification. The PCI Express basic physical layer consists of a differential transmit pair and a differential receiver pair. As such, dual simplex data on these point-to-point connection referred to herein as a "point-to-point link," is self-clocked and its bandwidth increases linearly with interconnect (link) width and frequency. In addition, PCI Express also provides a message space within its bus protocol that is used to implement legacy side band signals. As a result, a further reduction of signal pins produces a very low pin count connection for components and adapters.

Unfortunately, the use of a differential transmit pair and differential receive pair is a drastic deviation from traditional PCI. As a result, management of the serial (point-to-point) data links between transmit and receiver pairs utilizing traditional closed loop signaling may exceed the amount of latency tolerated by PCI Express. Moreover, power management envisioned using PCI Express cannot be supported utilizing traditional PCI techniques.

Furthermore, as point-to-point link speeds increase, it becomes more difficult to guarantee operation of the link by simply writing a link specification. Link-based systems, such as those based on PCI-E and, for example, cache coherent interconnect (CCI), have a mechanism where the transmitter transmits a "compliance pattern." As described herein, a compliance pattern refers to a sequence of bits that characterize the transmitter to generate the worst case eye diagram. PCI-E, for example, provides techniques for determining compliance for, for example, generation one speeds of, for example, 2.5 Gigabits per second. Hence, merely providing a link specification does not ensure correct operation of point-to-point links as future generations operate at higher generation link speeds.

BRIEF DESCRIPTION OF THE DRAWINGS

The various embodiments of the present invention are illustrated by way of example, and not by way of limitation, in the figures of the accompanying drawings and in which:

FIG. 6 is a flowchart illustrating a method for issuing a compliance pattern during a compliance testing mode according to a selected compliance speed, in accordance with one embodiment.

FIG. 7 is a flowchart illustrating a method for updating a compliance speed value contained within a configuration register, in accordance with one embodiment.

DETAILED DESCRIPTION

A method and apparatus for meeting compliance for debugging and testing a multi-speed, point-to-point link are described. In one embodiment, the method includes the selection of a compliance speed for a point-to-point link from at least two link frequencies supported by the point-to-point link. Once the compliance speed is selected for the point-to-point link, the point-to-point link is caused to enter a compliance testing mode. During operation of the compliance testing mode, a controller of the point-to-point link will set a compliance speed of the point-to-point link to the selected compliance speed. Once a compliance speed is set, a transmitter of the point-to-point link transmits a compliance pattern at the selected compliance speed. In one embodiment, the transmission of the compliance pattern at the selected compliance speed is used to generate a worst case eye diagram to determine compliance of the point-to-point link to a link specification.

In the following description, numerous specific details such as logic implementations, sizes and names of signals and buses, types and interrelationships of system components, and logic partitioning/integration choices are set forth to provide a more thorough understanding. It will be appreciated, however, by one skilled in the art that the invention may be practiced without such specific details. In other instances, control structures and gate level circuits have not been shown in detail to avoid obscuring the invention. Those of ordinary skill in the art, with the included descriptions, will be able to implement appropriate logic circuits without undue experimentation.

In the following description, certain terminology is used to describe features of the invention. For example, the term "logic" is representative of hardware and/or software configured to perform one or more functions. For instance, examples of "hardware" include, but are not limited or restricted to, an integrated circuit, a finite state machine or even combinatorial logic. The integrated circuit may take the form of a processor such as a microprocessor, application specific integrated circuit, a digital signal processor, a microcontroller, or the like.

System

Figure 1:
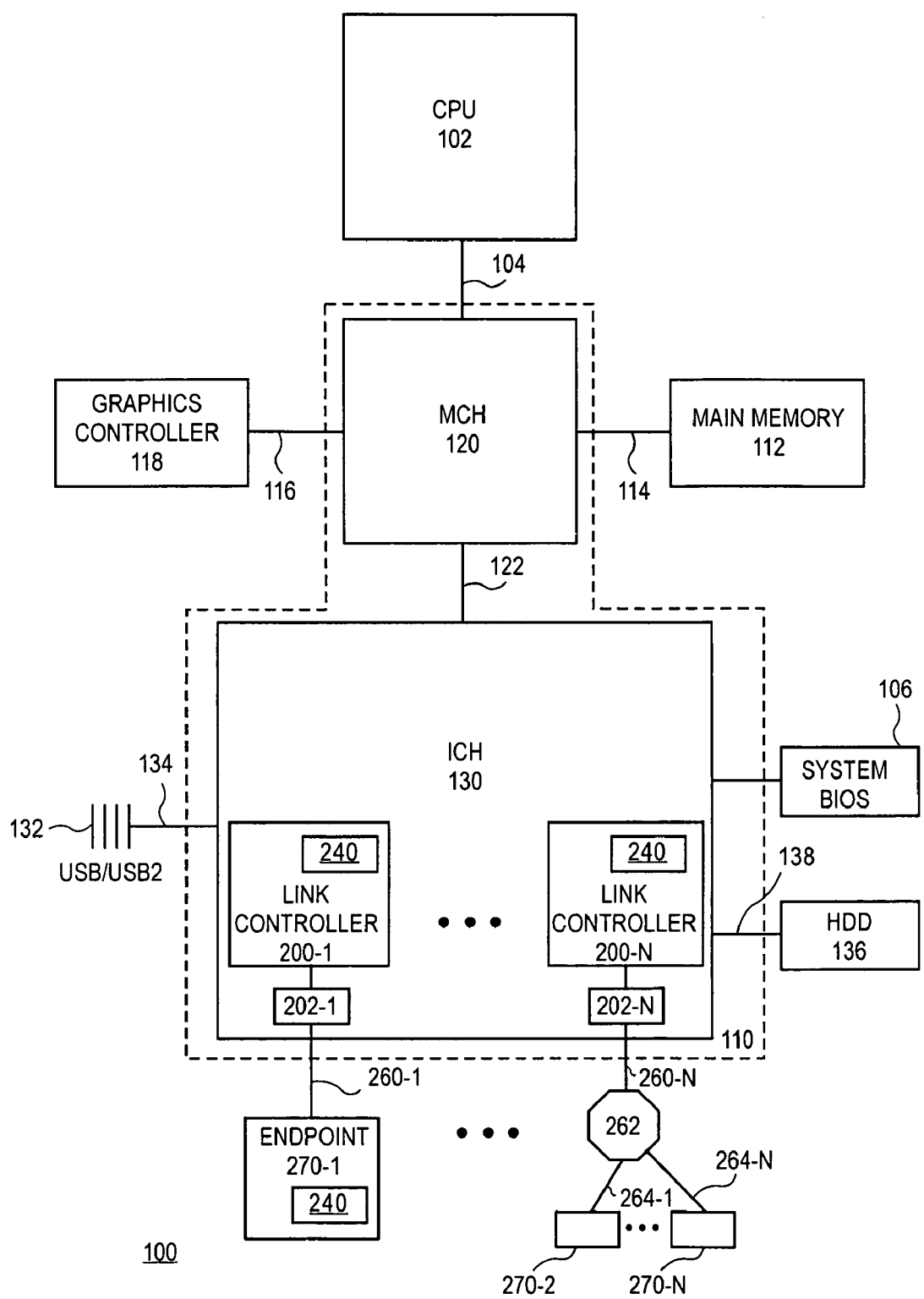
FIG. 1 is a block diagram illustrating a computer system supporting multi-speed, point-to-point links including compliance testing logic for debugging and testing the multi-speed, point-to-point links, in accordance with one embodiment.

FIG. 1 is a block diagram illustrating computer system 100 including compliance testing logic 240 to support debugging and compliance testing multi-speed, point-to-point links, in accordance with one embodiment. Representatively, computer system 100 comprises a processor system bus (front side bus (FSB)) 104 for communicating information between processor (CPU) 102 and chipset 110. As described herein, the term "chipset" is used in a manner to collectively describe the various devices coupled to CPU 102 to perform desired system functionality. In one embodiment, CPU 102 may be a multicore chip multiprocessor (CMP).

Representatively, chipset 110 may include memory controller hub 120 (MCH) coupled to graphics controller 118 via interconnect 116. In an alternative embodiment, graphics controller 118 is integrated into MCH 120, such that, in one embodiment, MCH 120 operates as an integrated graphics MCH (GMCH). Representatively, MCH 120 is also coupled to main memory 112 via interconnect 114. In one embodiment, main memory 114 may include, but is not limited to, random access memory (RAM), dynamic RAM (DRAM), static RAM (SRAM), synchronous DRAM (SDRAM), double data rate (DDR) SDRAM (DDR-SDRAM), Rambus DRAM (RDRAM) or any device capable of supporting high-speed buffering of data.

As further illustrated, chipset 110 includes an input/output (I/O) controller hub (ICH) 130. Representatively, ICH 130 may include a universal serial bus (USB) link or interconnect 134 to couple one or more USB slots 132 to ICH 130. Likewise, a serial advance technology attachment (SATA) 138 may couple hard disk drive devices (HDD) 136 to ICH 130. In one embodiment, basic input/output system (BIOS) 106 initializes computer system 100. Although chipset 110 is illustrated as including a separate MCH 120 and ICH 130, in one embodiment, MCH 120 may be integrated within CPU 102. In an alternate embodiment, the functionality of MCH 120 and ICH 130 are integrated within chipset 110.

In one embodiment, compliance testing logic 240 may be implemented within computer systems including an MCH integrated within a CPU, an MCH and ICH integrated within a chipset, as well as a system on-chip. Accordingly, those skilled in the art recognize that FIG. 1 is provided to illustrate one embodiment and should not be construed in a limiting manner. In one embodiment, ICH 130 includes link controllers 200 (200-1, 200-2, . . . , 200-N) for controlling one or more multi-speed, point-to-point links 260 (260-1, 260-2, . . . , 260-N).

Representatively, in one embodiment, point-to-point links 260 may support a point-to-point link protocol including, but not limited to, cache coherent interconnect (CCI), peripheral component interconnect (PCI) Express (PCI-E) or other like point-to-point interconnect. Accordingly, although one or more of the embodiments described herein may be provided with reference to PCI-E, those skilled in the art should recognize that the embodiments described herein are not limited to point-to-point links, which support PCI-E, and are therefore applicable to other like point-to-point link protocols.

Accordingly, in one embodiment, PCI-E links 260 may provide a point-to-point link, such as defined by PCI Express Base Specification 1.0a (Errata dated 7 Oct. 2003) to allow bi-directional communication between peripheral endpoint devices 290 (290-1, . . . , 290-N). Representatively, ICH 130 may include peripheral component interconnect PCI-E root ports 202 (202-1, . . . 202-N) to couple links 260 (260-1, . . . , 260-N) to link controllers 200 (200-1, . . . , 200-N) of ICH 130, referred to herein as the "fabric".

Representatively, peripheral endpoints 270-2 to 270-N are coupled to link 260 via switch 262 and interconnect 264 (264-1, . . . , 264-N), respectively. Consequently, endpoint 270-2 to 270-N are required to arbitrate for ownership of link 260 to issue transactions. Such arbitration is required since endpoints 270 are generally not allowed to simultaneously drive link 262. As described herein, an endpoint that is requesting data is referred to as a "requester." Likewise, an endpoint from which data is requested is referred to as a "completer." As further described herein, a device coupled to a point-to-point link may be referred to herein as a "link device."

As further illustrated in FIG. 1, an endpoint 270 may be directly coupled to a link controller 200 of ICH 130 via link 260. Representatively, endpoint 270-1 is directly coupled to link controller 200-1 via link 260-1. Although the embodiments described herein may be provided with reference to examples wherein the point-to-point links couple peripheral endpoint device 270 to chipset 110, those skilled in the art should recognize that the embodiments described herein may be provided to test any point-to-point links, such as, for example, cache coherent interconnect (CCI) of FSB 104 for coupling chipset 110 to CPU 102.

In the embodiments described, point-to-point links 260 operate as multi-speed, point-to-point links. For example, PCI-E is currently limited to single-speed, point-to-point links. In other words, current PCI-E point-to-point links operate according to a default 2.5 gigabits per second (Gb/s) generation one data rate. However, in the future, generation two PCI-E will support higher data rates of 5 Gb/s and in the future 10 Gb/s data. As described herein, the data rate at which a point-to-point link operates may be referred to as a "link frequency."

In one embodiment, point-to-point links 260 may support up to N generations of data rates. Accordingly, such links may comply with a generation one (GEN 1) link frequency, as well as one or more increased link frequencies, referred to as next generation link frequencies or (GEN N). Accordingly, the point-to-point links for coupling endpoints 270 and switches 262 to ICH 130 operate at multiple link frequencies, including link frequencies from such GEN 1, as well as future generation (GEN N) link frequencies. In one embodiment, compliance testing logic 240, for example, as shown in FIGS. 2 and 3, is provided to meet compliance for debugging and testing of multi-speed, point-to-point links 260, for example, as shown in FIG. 1, in accordance with one embodiment.

Hence, the adoption of link-based technology, such as PCI-E and CCI, link speeds will continue increasing, representing the various generations of the product. Thus, GEN 1 is the initial link speed that the protocol defines and with time and advances in signaling technology, higher generation speeds are being put to specification, e.g., GEN 2. In contrast to conventional point-to-point links, such as PCI-E, which generally issue compliance patterns at a generation one or GEN 1 frequency, link 260 operates at multiple frequencies to support future generation or GEN N frequencies.

Figure 2:
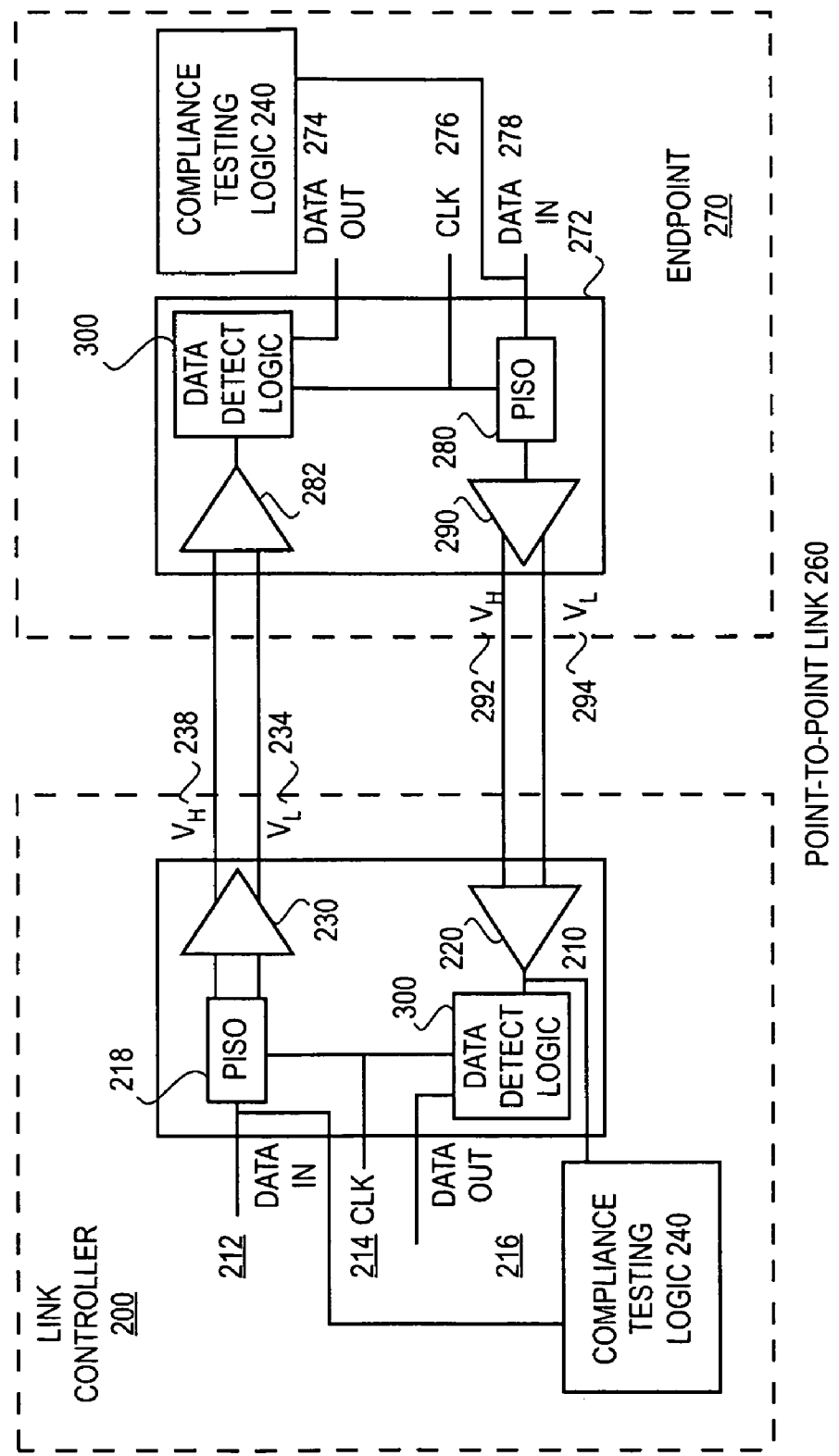
FIG. 2 is a block diagram further illustrating a multi-speed, point-to-point link including compliance testing logic, in accordance with one embodiment.
Figure 3:
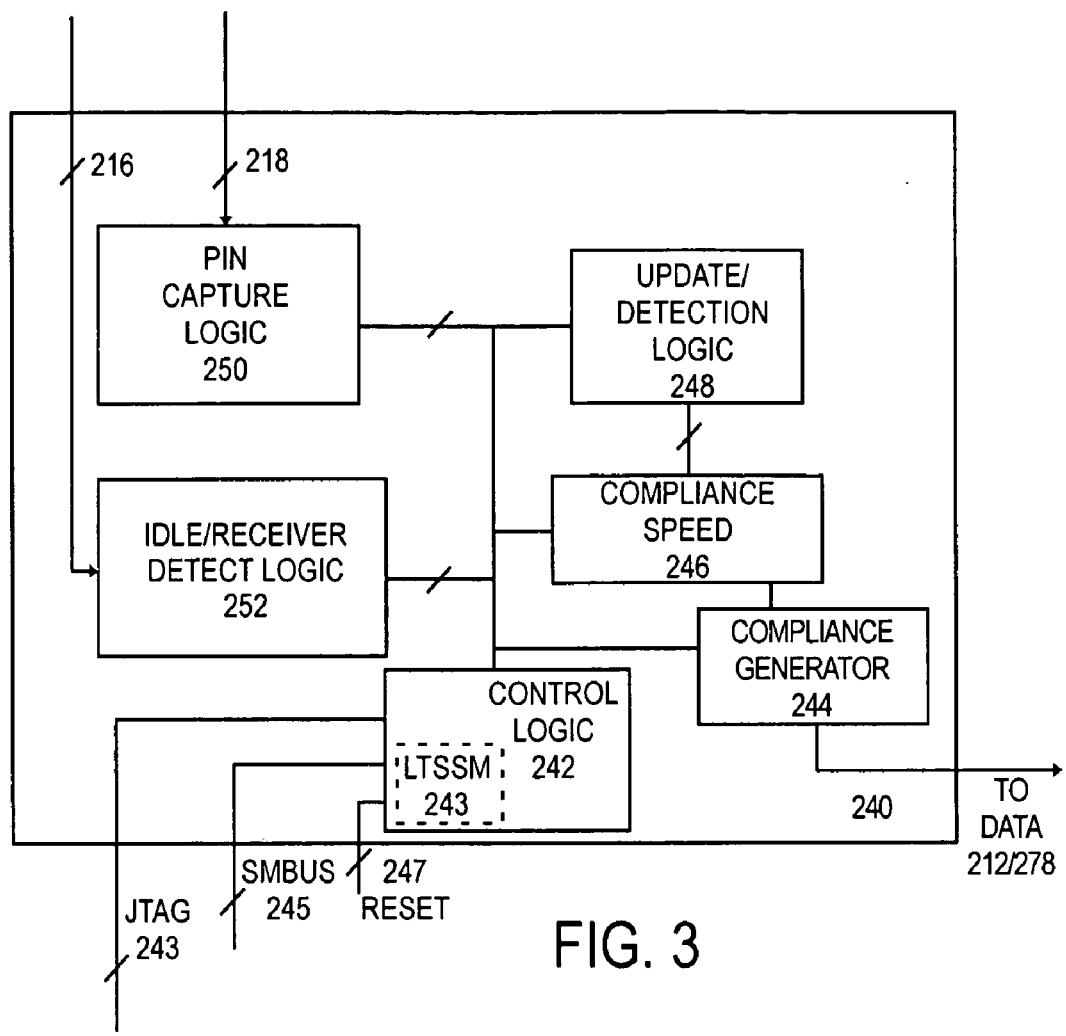
FIG. 3 is a block diagram further illustrating the compliance testing logic of FIGS. 1 and 2, in accordance with one embodiment.

In one embodiment, compliance testing logic 240, for example as shown in FIGS. 2 and 3, provides link initialization and training of point-to-point links 260, in accordance with one embodiment. As described herein, link initialization and training is a physical layer control process that configures and initializes a device as physical layer, port and associated link, so that normal packet traffic can be processed on the link. This process may automatically be initiated after reset without any software involvement. A subset of a link training and initialization process, referred as "link retraining," is initiated automatically as a result of a wake-up from a low power mode or due to an error condition that renders the link inoperable. In one embodiment, compliance testing logic 240 may include a link training and status state machine (LTSSM) as a physical layer of subblock responsible for link training and initialization.

FIG. 2 further illustrates point-to-point link 260-1, which couples link controller 200-1 to endpoint 270-1. Representatively, point-to-point link 260 represents a dual simplex communications channel between a transceiver 210 of link controller 200 and a transceiver 272 of endpoint 270. The point-to-point link shown in FIG. 2 includes two low voltage, differentially driven signal pairs, a transmit pair ($V_h$ 238 and $V_l$ 234) and a receive pair ($V_h$ 292 and $V_l$ 294). As illustrated, link 260 includes dual undifferential link is includes a driver and receiver pair 230 and 220 of transceiver 210, as well as a receiver and driver pair 282 and 290 of transceiver 272. In addition, a data clock 214/276 is embedded using an 8B/10B encoding scheme to achieve increased data rates.

In one embodiment, the transmitter and receiver link pair may be implemented utilizing one of an AC coupled line and a DC terminated line. In an alternate embodiment, the transceiver and receiver lane pair may be implemented utilizing one of a DC coupled and a DC terminated line with a common mode voltage of zero. In one embodiment, the definition of the 8B/10B transmission code is identical to that specified in ANSI X3.230-1994, clause 11 (and also IEEE 802.3Z, 36.2.4, July 1998).

Referring again to FIG. 2, link controller 200, as well as endpoint 270 includes compliance testing logic 240. Generally, link-based systems, such as those based on PCI-E and CCI, have a mechanism where the transmitter transmits a "compliance pattern." As described herein, a "compliance pattern" refers to a sequence of bits that characterize the transmitter to generate a worst case eye diagram. Since the patterns are used to test compliance of chips, compliance logic is generally defined in such a way that a link can be made to generate compliance patterns without the presence of any other active components, such as another chip.

Since compliance patterns are used to test the chip's transmitter characteristics for compliance to a link specification without any extra hardware, it is typically defined such that a transmitter can sense a passive load and enter a compliance testing mode. As described herein, a compliance testing mode or compliance testing, refers to a state of a link wherein the link will generate a compliance pattern according to a "compliance speed" stored within a configuration register, such as configuration register 246, as shown in FIG. 3.

Representatively, FIG. 3 further illustrates compliance testing logic 240, as shown in FIG. 3, which directs a transceiver 210/272 to issue a compliance pattern such that data detect logic 300 may be trained to enable proper detection of received serial bit streams and decoding of such serial bit streams into packetized data. Accordingly, in one embodiment, although testing of point-to-point link 260, as shown in FIG. 2, may be performed by coupling a link controller to an endpoint, in one embodiment, the endpoint is simply a compliance baseboard, which the link controller 200 may detect as a passive load to enter a compliance testing mode and issue a compliance pattern, which may be analyzed to determine a worst case eye diagram.

Referring again to FIG. 3, in one embodiment, the speed with which a transmitter drives compliance patterns in a compliance testing mode, referred to herein as a "compliance speed," is determined by a value in an architected read-write-sticky (RSW) register 246. In one embodiment, the default value with which control logic 242 sets a value within RSW register 246 is the highest link frequency that the point-to-point link supports. Thus, for a GEN 2 PCI-E link, for example, this register will reflect the value for a GEN 2 after power-on reset. This enables the testing in the highest generation link frequency without any extra control.

In one embodiment, control logic 242 decrements a compliance speed value within RSW register 246, modulo N whenever there is an entry to soft reset or an exit from compliance testing mode. In one embodiment, control logic 242 may include a link training and status state machine (LTSSM) 243, for example, as defined by PCI-E. In one embodiment, a state machine 243 of control logic 242 enters compliance testing mode or polling compliance, as defined by PCI-E in a GEN 1 speed.

In one embodiment, control logic 242, in conjunction with update/detection logic 248, determines whether a current compliance speed at which the link is operating, for example, for transmission of training sequences, is compared to a compliance speed value contained within the configuration register 246. In one embodiment, if the current compliance speed of operation is different than the compliance speed indicated by the configuration register, control logic 242 places the transmitter in electrical idle long enough to switch to a compliance speed indicated by the configuration register 246 and resumes operation at the compliance speed.

As described herein, the value contained with RSW register 246 may be referred to as a compliance speed value. In one embodiment, the value stored within the RSW register 246 may be referred to as a selected compliance speed value. As further described herein, the data rate at which a link operates during normal operation may be referred to as a link frequency. In one embodiment, following detection of exit from the compliance testing mode, control logic 242 switches to a GEN 1 compliance speed before entering a next state, such as, for example, a polling active state, as defined by the PCI-E specification.

As further illustrated in FIG. 3, update detection logic 248 may detect a write to a compliance speed value stored within control and status register (CSR) 246. In one embodiment, detection of an update to the compliance speed contained within CSR 246, may cause update/detection logic 248 to direct control logic 242 to alter the compliance speed of the link according to the value written into CSR register 246. In an alternative embodiment, pin capture logic 250 following, for example, a soft reset exit following a reset exit condition, may read a compliance speed value from a pin to detect a selected compliance speed value. In one embodiment, the selected compliance speed value is stored within the CSR 246, which then directs control logic 242 to alter the compliance speed of the link according to the compliance speed value contained within configuration register 246.

In a further embodiment, idle/receiver detect logic 252 may detect a pulse issued by, for example, a compliance baseboard coupled to the device (e.g., ICH 130). In response to such pulse, the compliance speed value within CSR 246 may be decremented modulo N until a desired, selected compliance speed value is stored within CSR 246. In one embodiment, an update to the CSR 246 may be performed with, for example, a joint test action group (JTAG) link 243. As further illustrated, a system management (SM) bus (SMbus), for example, may be used to write a selected compliance speed value to a pin, which is then captured by a pin capture logic 250. Likewise, control logic 242 may receive reset signal 247 to detect both soft resets and power-on resets.

Figure 4:
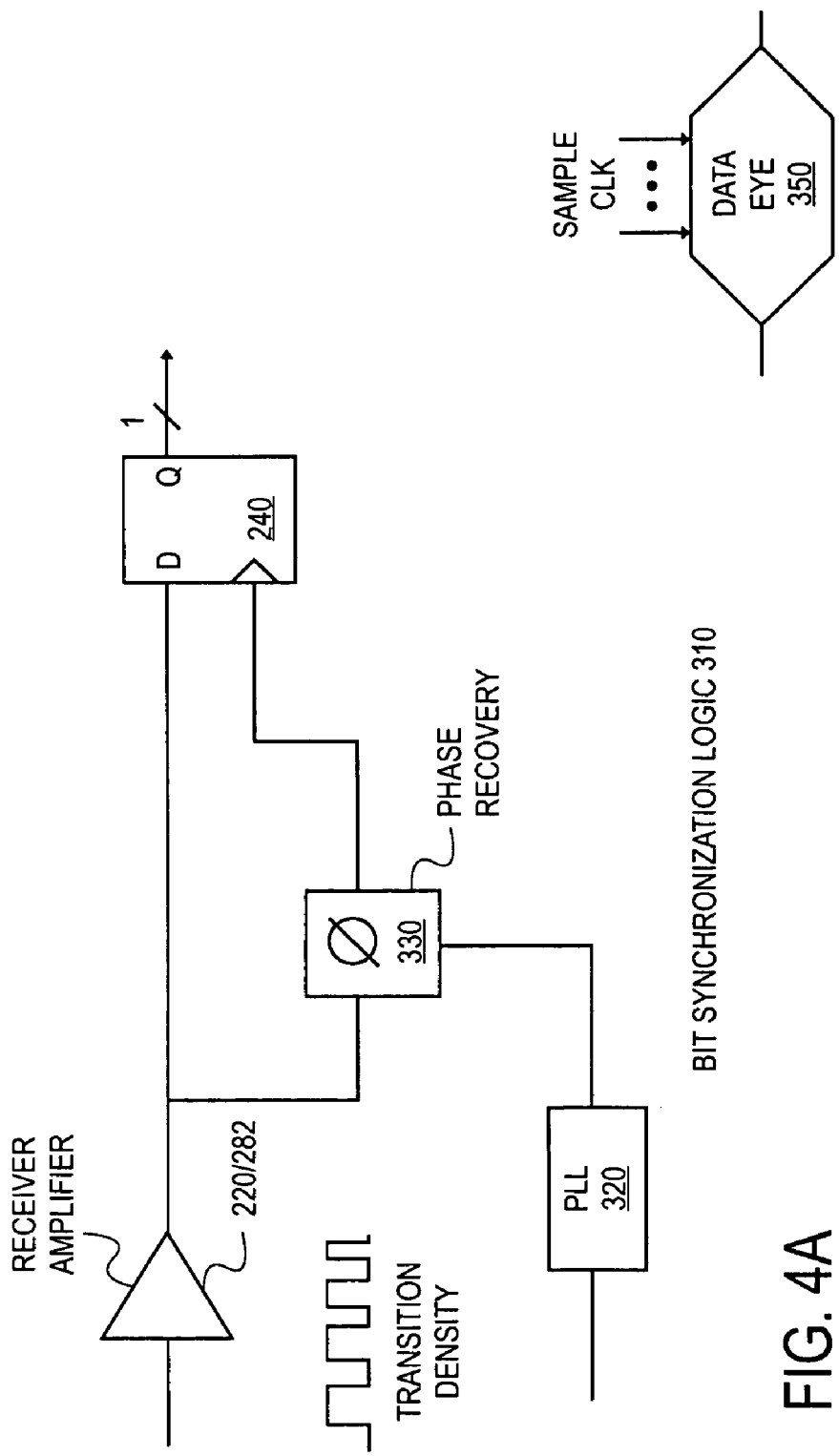
FIGS. 4A and 4B depict block diagrams illustrating bit synchronization logic for capturing a data eye, in accordance with one embodiment.

As part of the link initialization and training process, a receiver of a point-to-point link must be trained to achieve bit lock and symbol lock. Accordingly, before link training begins, a receiver phase-lock loop (PLL) is not yet synched with a remote transmitter transmit clock. As a result, the receiver is unable to differentiate between one received bit and another. Accordingly, during link training, the receiver's PLL is synched to the transmit clock and the receiver is then able to shift in the received serial bit stream, for example, as shown in FIGS. 4A and 4B.

As shown in FIGS. 4A and 4B, bit synchronization logic 310 of data detect logic 300 (FIG. 2) is further illustrated. Representatively, bit synchronization logic includes a receiver amplifier 230/282 (FIG. 2), which includes phase recovery logic 330, which is driven by a phase lock loop (PLL) 320. Once trained by the training sequences issued during compliance testing mode, the bit synchronization logic will be able to generate an adequate eye diagram 350 to properly interpret received information, which may be repacketized from a received serial bit stream.

Figure 5:
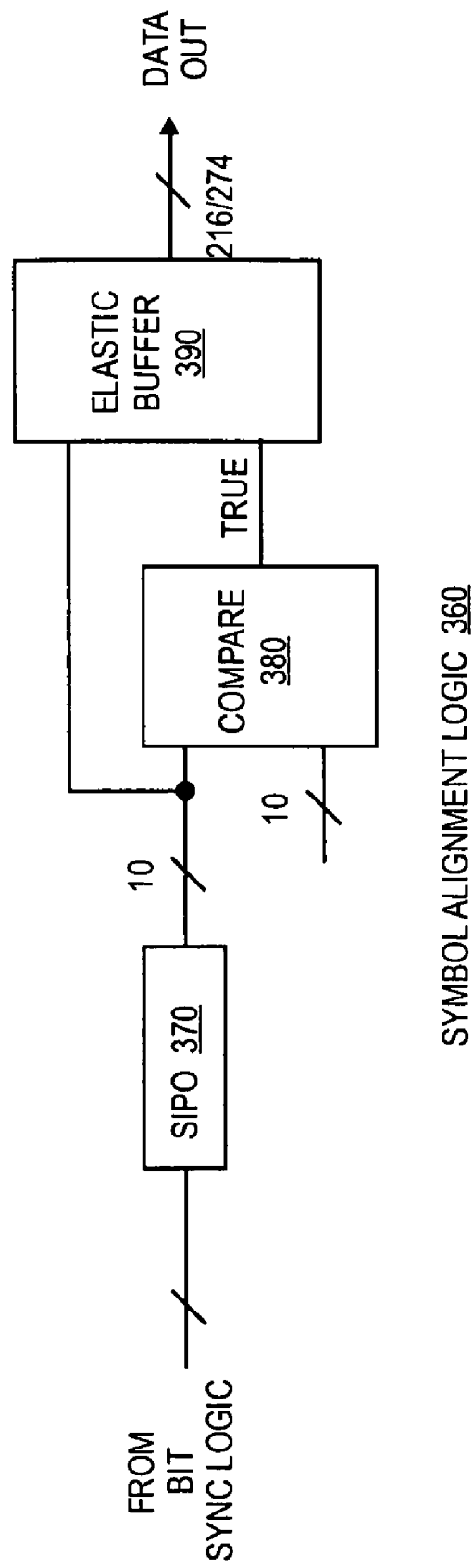
FIG. 5 is a block diagram illustrating symbol alignment logic, in accordance with one embodiment.

FIG. 5 depicts symbol alignment logic 360. Before link initialization and training, the receiver has no way of discerning the boundary between two, 10 bit symbols. During training, such as described by PCI-E, training sequences of ordered sets are exchanged, such that the receiver is able to locate a predetermined symbol, which is used to initialize a de-serializer or compare logic 380, as shown in FIG. 5. Representatively, the symbol alignment logic 360 includes a serial input parallel output logic 370, which receives data from bit synchronization logic 310. Using comparison logic block 380, the serial data received from SIPO 370 may be packetized and stored within elastic buffer 390 and output through data output 216/274 as packetized data, which may be provided to other link layers. Procedural methods for implementing one or more embodiments for compliance testing of a multi-speed, point-to-point link are now described.

Operation

Turning now to FIG. 6, the particular methods associated with various embodiments are described in terms of computer software and hardware with reference to a flowchart. The methods to be performed by a computing device (e.g., an endpoint/link controller) may constitute state machines or computer programs made up of computer-executable instructions. The computer-executable instructions may be written in a computer program and programming language or embodied in firmware logic. If written in a programming language conforming to a recognized standard, such instructions can be executed in a variety of hardware platforms and for interface to a variety of operating systems.

In addition, embodiments of the invention are not described with reference to any particular programming language. It will be appreciated that a variety of programming languages may be used to implement embodiments of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 6 is a flowchart illustrating a method 400 for meeting compliance for debugging and testing a multi-speed, point-to-point link, in accordance with one embodiment. In the embodiments described, examples of the described embodiments will be made with reference to FIGS. 1-4A and 4B. However, the described embodiments should not be limited to the examples provided to limit the scope provided by the appended claims.

Figure 8:
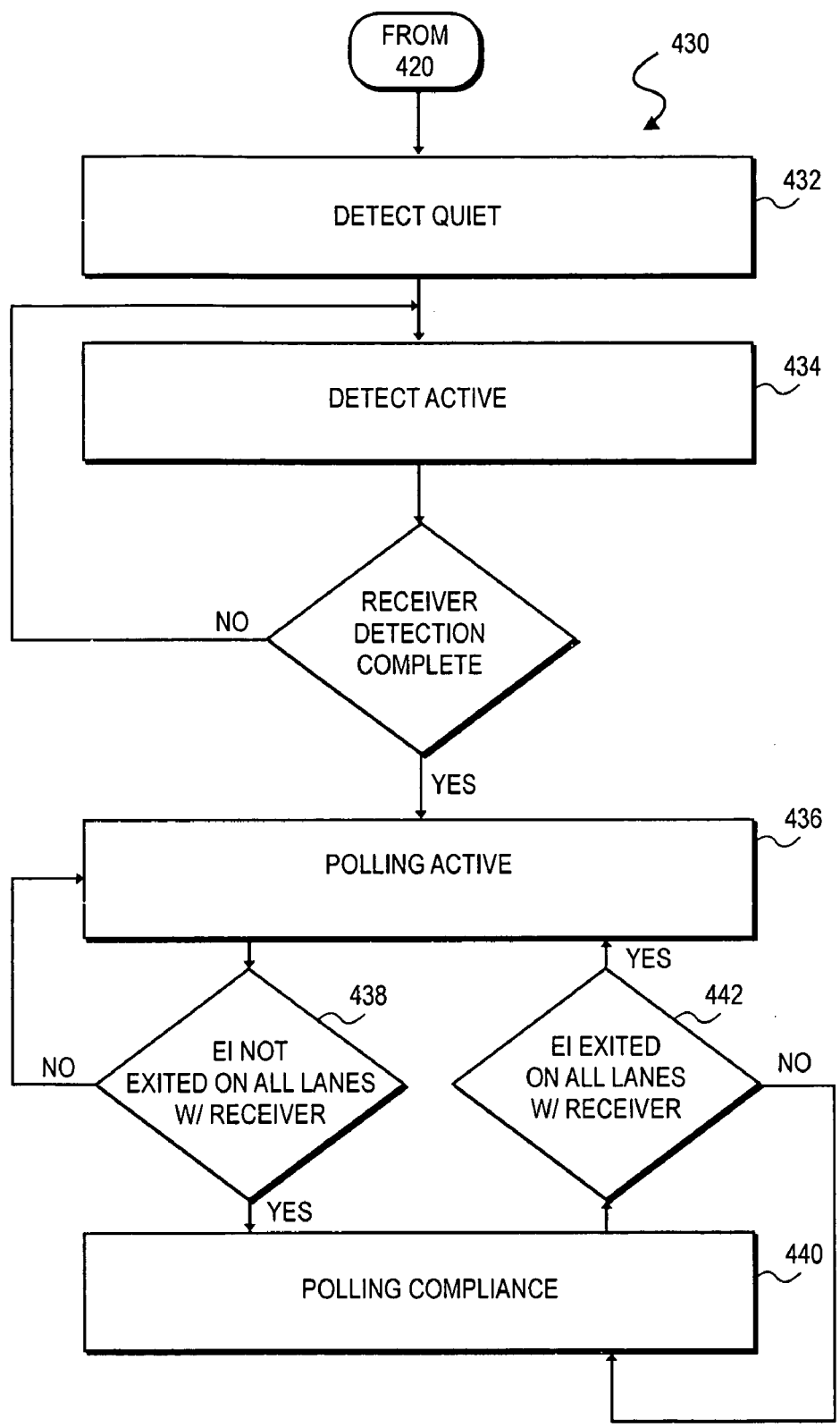
FIG. 8 is a flowchart illustrating a method for entering a compliance testing mode following system reset, in accordance with one embodiment.

Referring again to FIG. 6, at process block 420, it is determined whether a compliance testing entry condition is detected. In one embodiment, a compliance testing entry condition may be detected, as illustrated according to the flowchart of a method 420, as shown in FIG. 8. Once the compliance testing entry condition is detected, at process block 430, it is determined whether an update is detected to a compliance speed register (CSR). As indicated above, the data rate at which a point-to-point link operates may be referred to herein as a "link frequency." Likewise, the data rate at which an endpoint device or link controller drives a compliance pattern may be referred as a "compliance speed."

Figure 9:
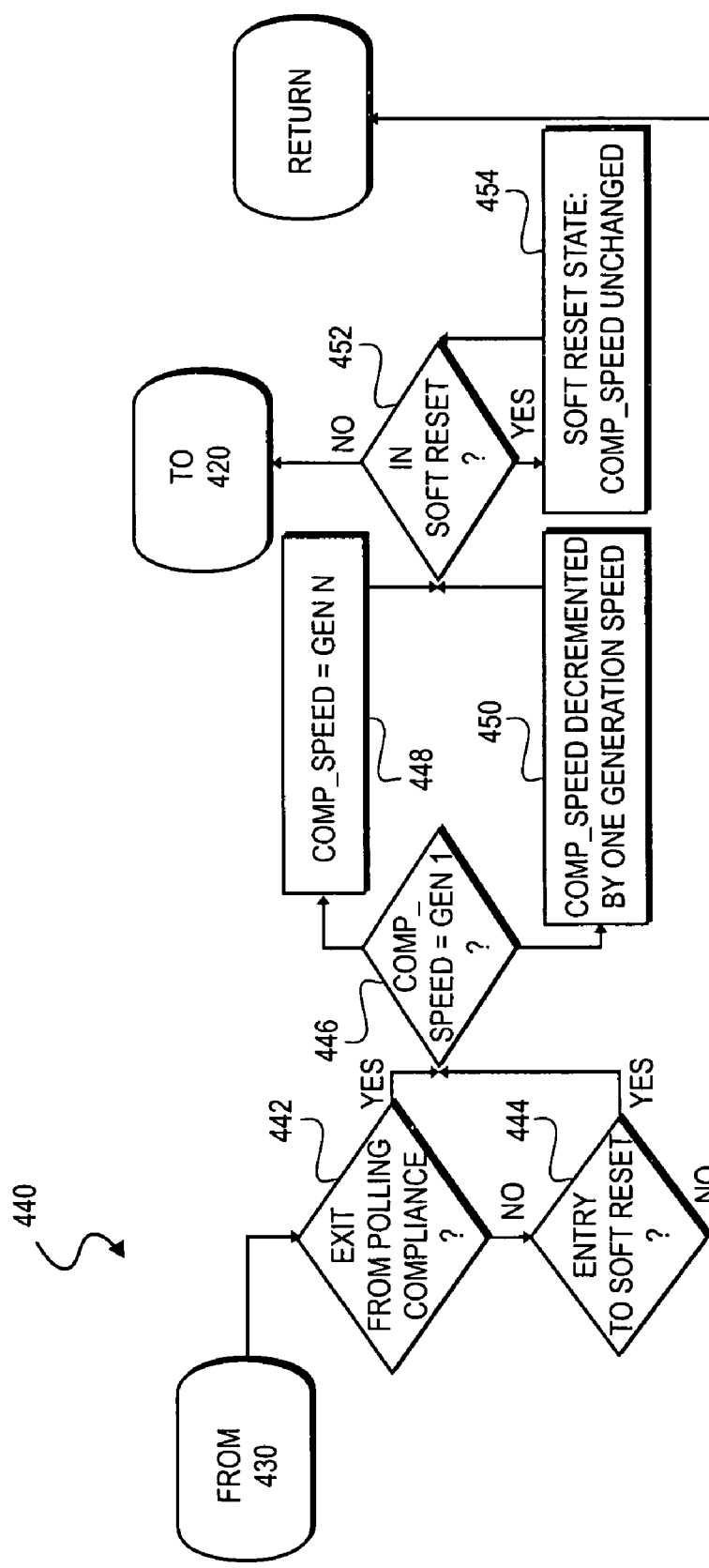
FIG. 9 is a flowchart for updating a compliance speed value stored within a configuration register, in accordance with one embodiment.
Figure 10:
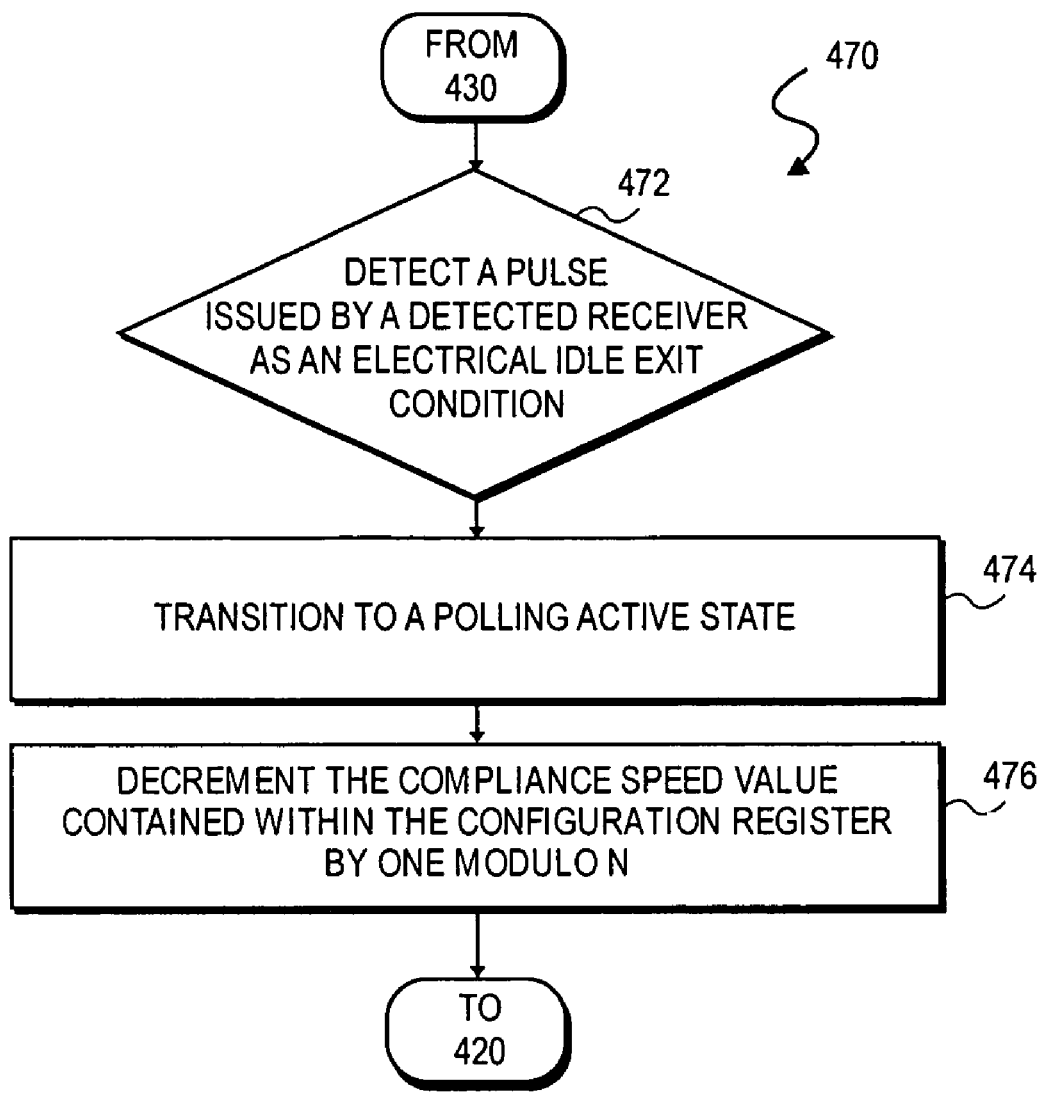
FIG. 10 is a flowchart illustrating a method for modifying a compliance speed value stored within a configuration register according to a pulse issued by a detected receiver, in accordance with one embodiment.

Referring again to FIG. 6, if a write is detected to the CSR, process block 460 is performed. Otherwise, control flow branches to process blocks 440 and 470, as shown in FIGS. 9 and 10, respectively. At process block 460, a compliance speed of the point-to-point link is updated to a selected compliance speed contained within the CSR. At process block 490, a compliance pattern is driven by a transmitter of the point-to-point link at the selected compliance speed dictated by a compliance speed value within the CSR.

Accordingly, as illustrated by the method 400, and as shown in the flowchart of FIG. 6, the speed at which a transmitter of a point-to-point link device drives compliance patterns in a compliance testing mode is determined by a compliance speed value in a configuration register or CSR, such as, for example, CSR 246, as shown in FIG. 3. As indicated above, CSR 246 may be architected as a read-write-sticky register, such that a value contained within the register is retained following power-on, or system reset. Accordingly, during compliance testing mode, a transmitter of the point-to-point link device outputs compliance patterns at the speed dictated by a compliance speed value contained within CSR 246, as shown in FIG. 3. Accordingly, to cause a link device to drive compliance patterns at various compliance speeds, an update to the compliance speed value contained within the configuration or CSR is required, according to one embodiment.

FIG. 7 is a flowchart illustrating a method 402 for causing an update to a compliance speed value contained within a CSR or configuration register to cause a point-to-point link device to drive a compliance pattern at a selected compliance speed, in accordance with one embodiment. At process block 404, it is determined whether a power-on reset exit condition is detected. Once detected, at process block 406, a compliance speed value (comp_speed), within the CSR is set to a highest supported compliance speed of the point-to-point link device.

Accordingly, in one embodiment, the default value contained within the CSR is a highest link frequency that the link device supports. Thus, for example, for a GEN 2 PCI-E link, the CSR register will reflect a value for GEN 2 (5 Gb/s) after power-on reset. This enables the testing in the highest generation speed without any extra control. In one embodiment, the value in the CSR may decrement modulo N (assuming N generations of data rates supported by a point-to-point link) whenever there is an entry to soft reset.

Accordingly, referring again to FIG. 7, at process block 408, it is determined whether a soft reset exit condition is detected. Once detected, at process block 410, the compliance speed value within the configuration register is updated according to a selected compliance speed value from an accessed pin. As shown in FIG. 7, a compliance speed of a point-to-point link may be assigned according to a strap pin of the link device.

In one embodiment, following exit from soft reset subsequent to a power-on reset exit condition, control logic 242, for example, as shown in FIG. 3, may access a predetermined pin to determine a selected compliance speed according to the pin. In one embodiment, the unavailability of a strap pin, or the lack thereof, may be achieved by a reuse of other output pins of the device, such as, for example, any hot plug related or SMbus related pins with a weak driver. In one embodiment, the strap pins, whether independent or shared with an output pin, are sampled by control logic 242 after exit from soft reset following the de-assertion of power-on reset to load CSR 246 with a compliance speed value.

FIG. 8 is a flowchart illustrating a method 420 for detecting a compliance testing entry condition, in accordance with one embodiment. As indicated above, point-to-point link specifications, such as, for example, PCI-E or CCI, use compliance patterns to test a chip's transmitter characteristics for compliance to a link specification without any extra hardware. Accordingly, such link devices are typically defined, such that the transmitter can sense a passive load and enter compliance testing.

Referring again to FIG. 8, when the link device exits from reset, it is in a detect.quiet state, as indicated by process block 432. After a predetermined amount of time, or if electrical idle is broken in its receiver, the link device will transition to a detect.active state, as indicated by process block 434. During the detect.active state, the link device will perform receiver detection.

For example, referring again to FIG. 2, in one embodiment, testing of the link controller 200 or endpoint 270 may be performed by attaching a passive device, such as, for example, a compliance baseboard (CBB). By attaching, for example, a compliance baseboard or CBB to a link device, the link device will detect one or more receivers of the attached CBB, as indicated by process block 435. Accordingly, following detection of one or more receivers, the link device enters a polling.active state at process block 436.

During the polling.active state, the link device will transmit training sequences (TS1) in a GEN 1 speed. If the link device that has not received any information within a certain window of time (e.g., 24 milliseconds for PCI-E) as indicated by process block 438, the link device will enter the polling compliance state, which is referred to herein as compliance testing mode, as indicated by process block 440. Accordingly, once in the compliance testing mode, the transmitter of the link device will output compliance patterns according to a compliance speed stored by the CSR 246.

FIG. 9 is a flowchart illustrating a method 440 for updating a compliance speed value within a CSR, in accordance with one embodiment. At process block 442, the link device determines there is an exit from polling compliance. If an exit from polling compliance is not detected, at process block 444, it is determined whether an entry to soft reset is detected. Accordingly, as shown in FIG. 9, the compliance speed value within the CSR configuration register maintains its value until some event occurs to change the compliance speed. Representatively, if an exit from polling compliance is detected, at process block 442, or an entry to soft reset is detected at process block 444, at process blocks 446-450, the value within the comp_speed register is decremented modulo N.

Although shown as being decremented, those skilled in the art will appreciate that the scope of the described embodiments and claims may include incrementing or other like change to the compliance speed value within the CSR according to the dictated events. Accordingly, at process block 450, the comp_speed is decremented by one generation speed unless the comp_speed equals a generation one speed, at which time, the value is decremented modulo N to return to the generation or GEN N compliance speed. At process block 452, it is determined whether the link device is in soft reset. If the link device is not in soft reset, control flows to process block 420, as shown in FIG. 6. Otherwise, soft reset state 454 is transitioned to and following an exit therefrom, control flow branches to process block 420.

Accordingly, as illustrated in FIG. 9, one technique for controlling the compliance speed of compliance patterns is by asserting and de-asserting the reset pin to achieve a selected compliance speed. As indicated above, in one embodiment, the default value for the compliance speed is the GEN N speed following power-on reset. Subsequent to power-on reset, the reset pin of the device may be applied to achieve one or more desired soft resets, which result in the decrementing or modification of the comp_speed value. However, the soft reset will cause the state machine of the link device to exit the compliance testing mode. Accordingly, following the soft reset, conditions are applied to cause the link device to enter the compliance testing mode and transmit compliance patterns at the selected compliance speed.

FIG. 10 is a flowchart illustrating a method 470 for causing an update to a comp_speed value contained within the CSR of the link device, in accordance with one embodiment. As indicated above, the transmitter differential pair of the link device is connected to a passive load of, for example, a compliance baseboard to cause the state machine or control logic of the link device to enter compliance testing mode in the GEN N speed. In other words, to cause the link device to enter the compliance testing mode, the differential pairs of the compliance baseboard may be held in electrical idle (EI) for a predetermined amount of time.

Accordingly, in one embodiment, as illustrated at process block 472, it is determined whether a pulse is detected that is issued by a detected receiver as an electrical idle exit condition. (See process block 442 of FIG. 8.) The pulse will cause an exit from electrical idle to be detected by control logic of the link device and cause a link device to enter a polling.active state, as indicated at process block 474. This transition causes the compliance speed value in the CSR to be decremented, as illustrated at process block 476.

Once in the polling.active state, for example, as shown in FIG. 8, at process block 438, it will not detect electrical idle and electrical idle exit condition on all receiver lanes. (See process block 438 of FIG. 8.) Accordingly, the link device will once again enter polling compliance or the compliance testing mode, as shown at process block 440. Accordingly, after a time-out, the link device will enter the polling compliance or compliance testing mode at a different compliance speed. As a result, by transmitting various pulses using a compliance baseboard to the link device, compliance patterns may be emitted from the link device at each link frequency supported by the link device.

Figure 11:
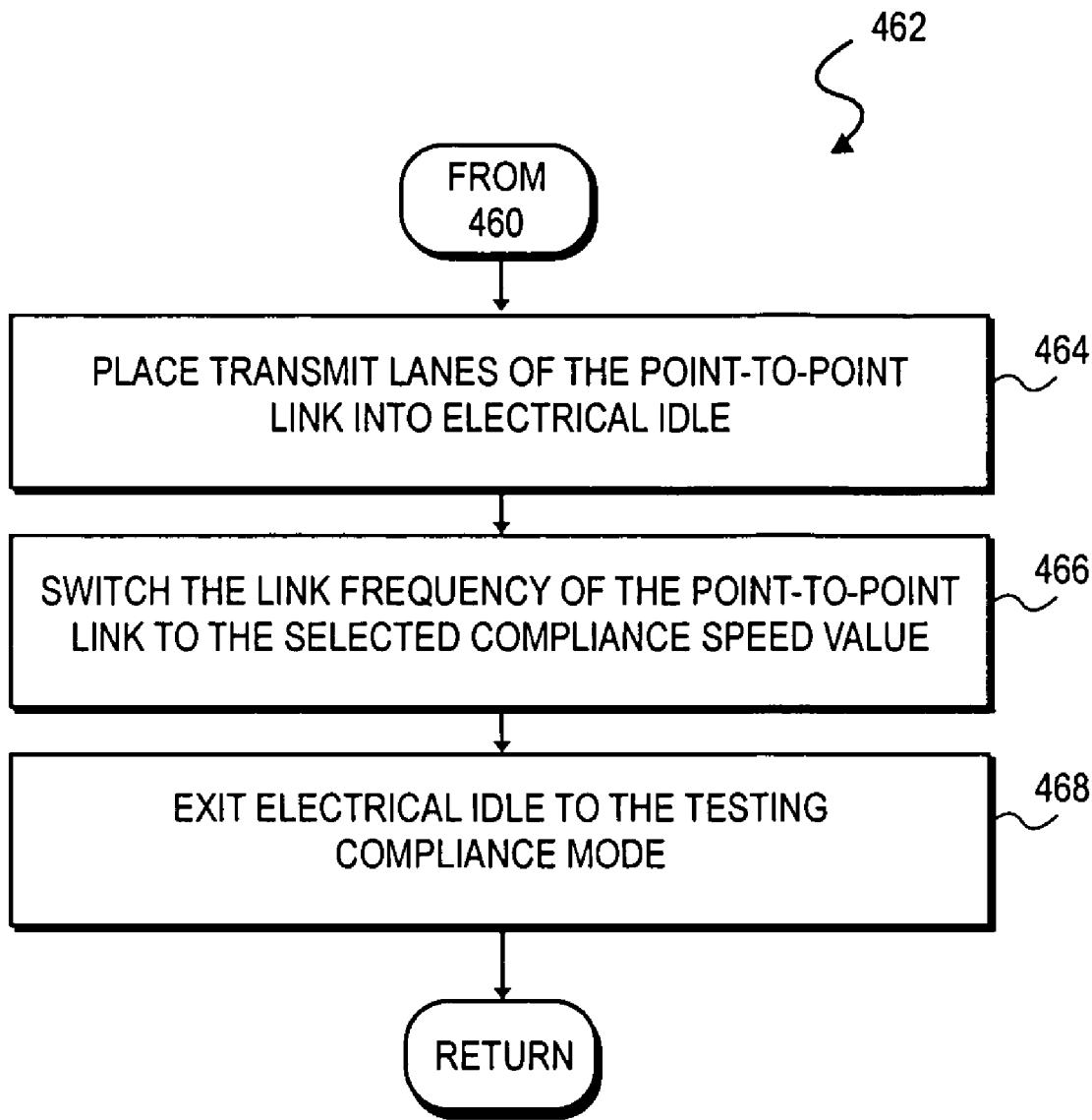
FIG. 11 is a flowchart for switching or updating the compliance speed of a point-to-point link, in accordance with one embodiment.

FIG. 11 is a flowchart illustrating a method for updating the compliance speed of a link device, in accordance with one embodiment. At process block 464, the link device places the transmit lanes of the point-to-point link into an electrical idle state. At process block 466, the compliance speed of the point-to-point link is switched to the selected compliance speed value contained within the CSR or configuration register. Finally, at process block 468, an exit from electrical idle is performed to return to the testing compliance mode.

Point-to-point link interface designs, such as, for example, PCI-E and CCI, are fast becoming industry standards in client servers and communications servers. With technology advances, future generations of high-speed, point-to-point links, such as, for example, PCI-E interconnects, have been introduced. Accordingly, in one embodiment, compliance testing logic, such as shown in FIGS. 1-3, may be used to cause a link device to drive compliance patterns at the multiple link frequencies supported by the link device to generate worst case eye diagrams for each compliance speed supported by the device. Accordingly, in one embodiment, compliance testing logic will enable verification of the behavior of the point-to-point link for current, as well as future, data rates as supported by the point-to-point link including, but not limited to, PCI-E, CCI, or other like point-to-point link protocols.

Figure 12:
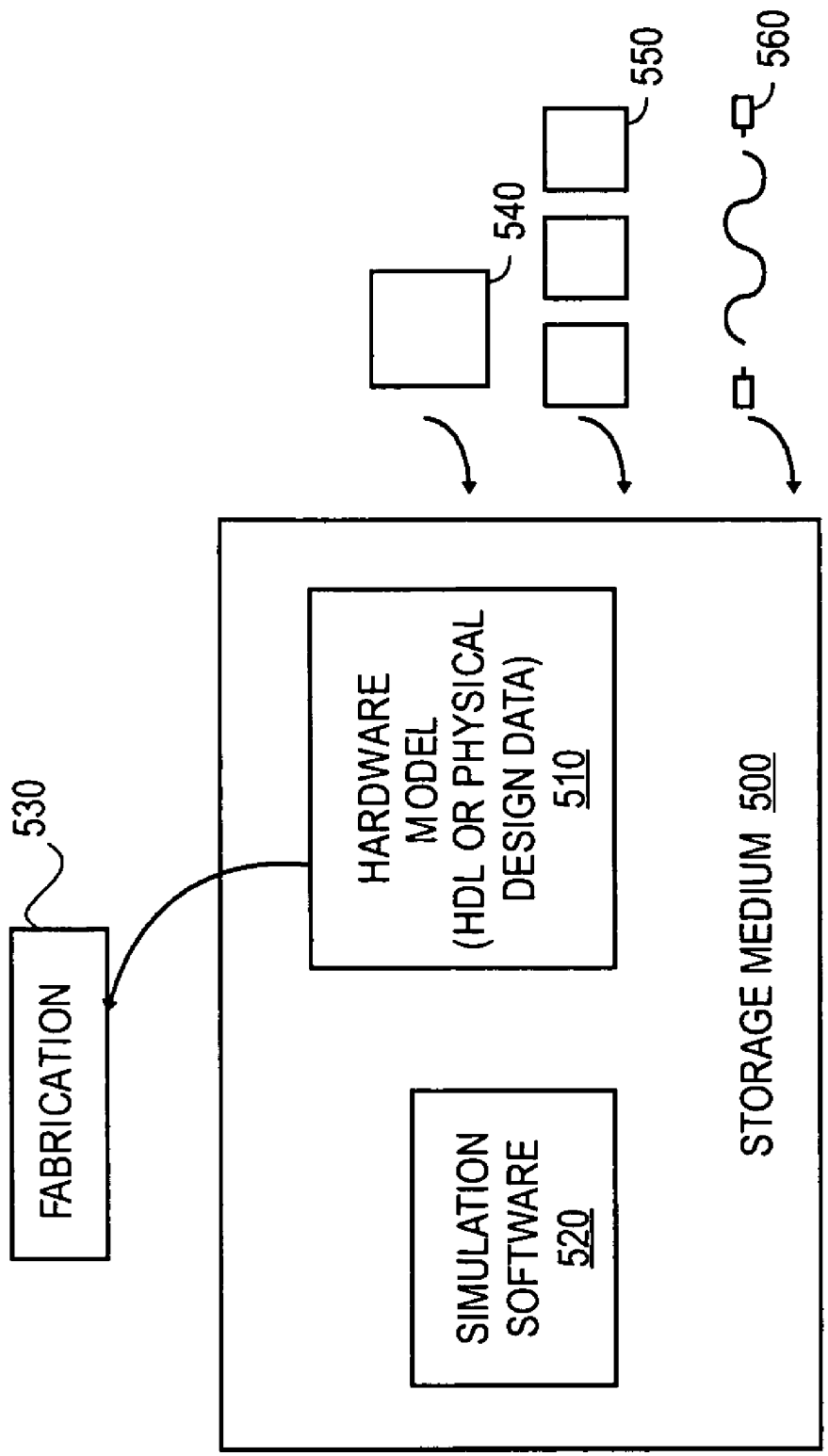
FIG. 12 is a block diagram illustrating various design representations for formats for simulation, emulation and fabrication of a design using the disclosed techniques.

FIG. 12 is a block diagram illustrating various representations or formats for simulation, emulation and fabrication of a design using the disclosed techniques. Data representing a design may represent the design in a number of manners. First, as is useful in simulations, the hardware may be represented using a hardware description language, or another functional description language, which essentially provides a computerized model of how the designed hardware is expected to perform. The hardware model 510 may be stored in a storage medium 500, such as a computer memory, so that the model may be simulated using simulation software 520 that applies a particular test suite 530 to the hardware model to determine if it indeed functions as intended. In some embodiments, the simulation software is not recorded, captured or contained in the medium.

In any representation of the design, the data may be stored in any form of a machine readable medium. An optical or electrical wave 560 modulated or otherwise generated to transport such information, a memory 550 or a magnetic or optical storage 540, such as a disk, may be the machine readable medium. Any of these mediums may carry the design information. The term "carry" (e.g., a machine readable medium carrying information) thus covers information stored on a storage device or information encoded or modulated into or onto a signal. The set of bits describing the design or a particular of the design are (when embodied in a machine readable medium, such as a carrier or storage medium) an article that may be sealed in and out of itself, or used by others for further design or fabrication.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments described may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

In the above detailed description of various embodiments of the invention, reference is made to the accompanying drawings, which form a part hereof, and in which are shown by way of illustration, and not of limitation, specific embodiments in which the invention may be practiced. In the drawings, like numerals describe substantially similar components throughout the several views. The embodiments illustrated are described in sufficient detail to enable those skilled in to the art to practice the teachings disclosed herein. Other embodiments may be utilized and derived therefrom, such that structural and logical substitutions and changes may be made without departing from the scope of this disclosure. The following detailed description, therefore, is not to be taken in a limiting sense, and the scope of various embodiments of the invention is defined only by the appended claims, along with the full range of equivalents to which such claims are entitled.

Having disclosed embodiments and the best mode, modifications and variations may be made to the disclosed embodiments while remaining within the scope of the embodiments as defined by the following claims.

What is claimed is:

1. A method comprising:
   selecting a compliance speed for communication over a point-to-point link, the compliance speed selected from at least two link frequencies supported by the point-to-point link;
   causing a link controller of the point-to-point link to enter a compliance testing mode; and
   analyzing a compliance pattern transmitted over the point-to-point link, at the selected compliance speed, to determine whether communication over the point-to-point link, at a link frequency selected as the compliance speed, is in compliance with a link specification.

2. The method of claim 1, wherein the causing the link controller of the point-to-point link to enter the compliance testing mode comprises:
   attaching a compliance baseboard to the point-to-point link;
   detecting, by the link controller of the point-to-point link, the compliance baseboard as a receiver during operation in a detect active state;
   detecting, during operation in a polling active state, expiration of a predetermined period of time from the detecting of the compliance baseboard as a receiver; and entering, by the link controller of the point-to-point link, a polling active state as the compliance testing mode.

3. The method of claim 1, wherein the causing the link controller of the point-to-point link to enter the compliance testing state further comprises:

issuing a write to a configuration register of the link controller of the point-to-point link to store the selected compliance speed within the configuration register;

detecting, by the link controller of the point-to-point link, the write issued to configuration; and updating, during operation in the compliance testing mode, a compliance speed for communication over the point-to-point link to the selected compliance speed contained within the configuration register.

4. The method of claim 1, wherein the selecting the compliance speed for the communication over the point-to-point link further comprises:

issuing a soft reset to the link controller of the point-to-point link to cause an update to a compliance speed value stored within a configuration register of the link controller of the point-to-point link to one of increase and decrease the compliance speed value stored within the configuration register; and repeating issuing of the soft reset to the link controller of the point-to-point link until the compliance speed value within the configuration register equals the selected compliance speed.

5. The method of claim 1, wherein causing the link controller of the point-to-point link further to enter the testing compliance mode comprises:

issuing, by a compliance baseboard, a pulse over the point-to-point link to cause the link controller of the point-to-point link to exit from electrical idle and enter a polling active state;

updating, by the link controller of the point-to-point link, a compliance speed value within a configuration register to one of increase and decrease the compliance speed value within the configuration register prior to entry into the polling active state; and repeating the issuing of the pulse over the point-to-point link and the updating of the configuration register by the link controller of the point-to-point link until the compliance speed value stored within the configuration register equals the selected compliance speed.

6. The method of claim 1, wherein selecting the compliance speed for the communication over the point-to-point link further comprises:

issuing a power-on reset to the link controller of the point-to-point link;

driving a pin of the link controller of the point-to-point link with the selected compliance speed prior to exit from soft reset; and updating, by the link controller of the point-to-point link, a compliance speed value within a configuration register according to the selected compliance speed value sampled from the pin of the link controller of the point-to-point link.

7. The method of claim 1, wherein selecting the compliance speed further comprises:

issuing a power-on reset to the link controller of the point-to-point link; and setting, by the point-to-point link, a compliance speed value within a configuration register to a highest compliance speed value supported for communication over the point-to-point link.

8. An article of manufacture comprising a machine-accessible storage medium having associated data, wherein the data, when accessed, results in a machine performing:

updating, during operation in compliance testing, a compliance speed for communication over a point-to-point link to a selected compliance speed contained within a configuration register; and driving, by a transmitter of the point-to-point link, a compliance pattern over the point-to-point link at the selected compliance speed to determine whether communication over the point-to-point link, at a link frequency corresponding to the compliance speed, is in compliance with a link specification.

9. The article of manufacture of claim 8, wherein the machine-accessible storage medium further includes data, which when accessed by the machine, further results in the machine performing:

detecting a pulse issued by a detected receiver as an electrical idle exit condition;

transitioning to a polling active state; and decrementing the selected compliance speed contained within the configuration register.

10. The article of manufacture of claim 8, wherein updating the compliance speed, further results in the machine performing:

detecting, during operation in a power-on reset mode, a power-on reset exit condition;

setting a compliance speed value within a configuration register to a highest supporting compliance speed;

detecting a soft reset exit condition;

updating the compliance speed value within the configuration register according to a selected compliance speed value from an accessed pin.

11. The article of manufacture of claim 8, wherein prior to updating the compliance speed, further results in the machine performing:

detecting a compliance testing entry condition;

accessing a configuration register to determine the selected compliance speed; and comparing the selected compliance speed to a previous compliance speed to determine whether to update the compliance speed for the communication over the point-to-point link.

12. The article of manufacture of claim 8, wherein updating the compliance speed further results in the machine performing:

placing transmit lanes of the point-to-point link into electrical idle;

switching the compliance speed for the communication over the point-to-point link to the selected compliance speed; and exiting electrical idle to the testing compliance mode.

13. The article of manufacturing of claim 8, wherein the machine-accessible medium further includes data, which accessed by the machine, results in the machine performing:

detecting, during operation in the compliance testing mode, a compliance testing mode exit condition; and once the compliance testing mode exit condition is detected, decrementing the selected compliance speed value within the configuration register.

14. The article of manufacture of claim 8, wherein the machine accessible medium further includes data, which when accessed by the machine, further results in the machine performing:

detecting, during operation in a compliance testing mode, a soft reset entry condition; and decrementing the selected compliance speed contained within the configuration register.

15. The article of manufacture of claim 13, wherein the machine accessible medium further includes data, which when accessed by the machine, further results in the machine performing:

detecting a compliance testing mode entry condition;
detecting an updated compliance speed value contained within the configuration register; and
updating the compliance speed for the communication over the point-to-point link according to the updated compliance speed value contained within the configuration register.

16. A system comprising:

a chipset coupled to at least one compliance baseboard via a point-to-point link, the chipset comprising:
an input/output (I/O) controller to access a predetermined storage location to determine a selected compliance speed during operation in a compliance testing mode and to set a link frequency of the point-to-point link to the selected compliance speed, and
a transceiver to drive a compliance pattern at the selected compliance speed to the compliance baseboard to determine whether communication over the point-to-point link, at a link frequency corresponding to the selected compliance speed, is in compliance with a link specification.

17. The system of claim 16, wherein the compliance baseboard further comprises:

a pulse generator to issue a pulse to a transceiver of the chipset during operation of the chipset in the testing compliance mode to cause the controller to decrement a compliance speed value stored within a configuration register.

18. The system of claim 16, wherein the chipset further comprises:

logic to sample a pin after exit from a soft reset following deassertion of a power-on reset.

19. The system of claim 16, wherein the chipset further comprises:

receiver detection logic to detect the attached compliance baseboard to enter the compliance testing mode.

20. The system of claim 16, wherein the predetermined storage location comprises:

a read-write-sticky configuration register to store the selected compliance speed value.

21. An apparatus comprising:

a controller coupled to at least one compliance baseboard via a point-to-point link, the controller to access a predetermined storage location to determine a selected compliance speed during operation in a compliance testing mode and to set a link frequency for communication over the point-to-point link corresponding to the selected compliance speed; and
a transceiver coupled to the controller to drive a compliance pattern at the selected compliance speed to the compliance baseboard to determine whether communication over the point-to-point link, at a link frequency selected as the compliance speed, is in compliance with a link specification.

22. The apparatus of claim 21, wherein the controller further comprises:

logic to sample a pin after exit from a soft reset following deassertion of a power-on reset.

23. The apparatus of claim 21, wherein the controller further comprises:

receiver detection logic to detect the attached compliance baseboard to enter the compliance testing mode.

24. The apparatus of claim 21, wherein the predetermined storage location comprises a read/write sticky configuration register to store the selected compliance speed value.

25. The apparatus of claim 21, wherein the controller comprises:

an input/output (I/O) controller.

* * * * *

UNITED STATES PATENT AND TRADEMARK OFFICE
CERTIFICATE OF CORRECTION

PATENT NO.       : 7,633,877 B2                                              Page 1 of 1
APPLICATION NO.  : 11/283303
DATED            : December 15, 2009
INVENTOR(S)      : Sharma et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1062 days.

Signed and Sealed this

Twenty-first Day of December, 2010

David J. Kappos
*Director of the United States Patent and Trademark Office*